Patented June 12, 1951

2,556,312

UNITED STATES PATENT OFFICE 2,556,312

PRODUCTION OF DIALDEHYDE DIACETALS

Frank G. Young, Charleston, W. Va., assignor, by mesne assignments, to Union Carbide and Carbon Corporation, a corporation of New York No Drawing. Application October 4, 1949, Serial No. 119,561

7 Claims. (Cl. 260—333)

This invention relates to the production of diacetals of dialdehydes, and more especially it concerns diacetal derivatives of malondialdehyde and the higher saturated aliphatic dialdehydes. The invention also concerns a novel process for producing these compounds by reacting an ester of orthoformic acid with an alkenyl aliphatic ether, including the vinyl aliphatic ethers, or with a singly unsaturated heterocyclic mono ether such as dihydropyran, in the presence of certain hydrous aluminum silicates and inorganic materials having essentially a hydrous aluminum silicate structure, as hereinafter more fully described.

Among the diacetals produced by the process of the invention are those of the type designated by the formula $(R'O)_2CHCR^2R^3[CH(OR^5)CR^2R^3]_xCH(OR^4)(OR^5)$ wherein $R'$ represents an alkyl, cycloalkyl, aralkyl, aryl, halogen-substituted alkyl, alkoxyalkyl, aryloxyalkyl or alkenyl group; $R^2$ and $R^3$, respectively, represent hydrogen or an alkyl group; $R^4$ represents an alkyl, cycloalkyl, alkoxyalkyl or halogen-substituted alkyl group, or $R^2$ and $R^4$ together represent a closed hydrocarbon chain —$(CH_2)_y$— wherein $y$ is an integer from 2 to 3; and $R^5$ designates a radical of the classes here represented by $R'$ and $R^4$; and $x$ is zero or an integer. The products of the invention find application as intermediates for the synthesis of pyrimidines and other compounds useful as pharmaceutical intermediates.

In reacting the orthoformic ester with an open chain alkenyl alkyl ether the initial overall reaction is represented by the equation:

$(R'O)_2(R^5O)CH + R^2R^3C=CHOR^4 \rightarrow$
$(R'O)_2CHCR^2R^3CH(OR^4)(OR^5)$ in which $R'$ to $R^5$ have the hereinbefore described meanings. The resultant primary condensation products are diacetals of malondialdehyde, and can react subsequently with additional quantities of the alkenyl alkyl ether to produce diacetals of alkoxy-substituted higher dialdehydes having an odd number of at least three carbon atoms in the dialdehyde carbon chain, each of the terminal carbon atoms of such chain having directly attached thereto two oxy atoms of a corresponding acetal group and each of the odd numbered carbon atoms of the dialdehyde carbon chain excepting said terminal carbon atoms having an ether oxygen attached thereto, according to the equations:

$(R'O)_2CHCR^2R^3CH(OR^4)(OR^5) +$
$R^2R^3C=CHOR^4 \rightarrow (R'O)_2$
$CHCR^2R^3CH(OR^5)CR^2R^3CH(OR^4)_2$ and $(R'O)_2CHCR^2R^3CH(OR^4)CR^2R^3CH(OR^5)(OR^4)$ each of which can react with further amounts of the ether to form compounds of the aforesaid type:

$(R'O)_2CHCR^2R^3[CH(OR^5)CR^2R^3]_xCH(OR^4)(OR^5)$

When reacting an orthoformate ester with a closed chain alkenyl ether such as 2-dihydrofuran and 2-dihydropyran, having an olefinic double bond in the 2-position, the initial condensation reaction may be represented as follows:

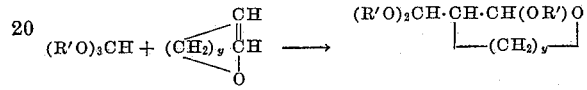

wherein $R'$ and $y$ have the meanings hereinbefore indicated.

Processes already are known for condensing orthoformic acid esters with alkenyl alkyl ethers in the presence of strongly acidic homogeneous Friedel-Crafts type catalysts which are soluble in the reaction medium. The present invention is based in important part upon the discovery that by replacing such homogeneous catalysts with the heterogeneous catalysts herein described, increased yields of dialdehyde diacetals are secured with higher efficiencies. Moreover, when using in the process the heterogeneous catalysts of this invention, larger yields of the primary condensation products $(R'O)_2CHCR^2R^3CH(OR^5)(OR^4)$ are secured with higher efficiencies than are secured when using the acidic Friedel-Crafts catalysts, while the production of the secondary products of the type $(R'O)_2CHCR^2R^3[CH(OR^5)CR^2R^3]_xCH(OR^4)(OR^5)$ where $x$ is 1 or more is inhibited or retarded.

The use of the heterogeneous catalysts of this invention permits the elimination of the neutralization step previously necessary for removal of the catalyst when using homogeneous catalysts. In this process simple decantation or filtration of the reaction mixture suffices for removal of the catalyst. Alternately, these catalysts may be left in situ during the isolation and purification procedures without adverse effect, whereas, with the acidic homogeneous catalysts, this is not possible without serious losses in yields and efficiencies.

Another outstanding advantage attendant upon the use of these heterogeneous catalysts resides in the fact that it is not necessary to keep the reaction mixtures completely anhydrous. Catalysts of the type herein described containing as much as 5% of adsorbed water have proved as effective in the process as substantially dry ones.

These heterogeneous catalysts are more easily adapted for continuous operation of the process than are the acidic homogeneous type catalysts of the Friedel-Crafts type, and the former are cheaper and hence are more suitable for use commercially. The heterogeneous catalysts also may be used in a fixed catalyst bed with the reactants being circulated in contact with the bed in well-known manner. Under normal operating conditions the life of these catalysts appears to be very long.

The class of active heterogeneous catalysts of the invention may best be characterized as clay minerals having essentially a hydrous aluminum silicate structure, with or without the isomorphous substitution of other atoms such as those of sodium, potassium, calcium, magnesium or iron for part of the aluminum and silicon ions of the crystal lattice (as shown by chemical analysis, electron diffraction, and a study of the ion-exchange properties). Such catalysts may have been activated by treatment with a mineral acid such as sulfuric acid or hydrochloric acid in well-known manner, as herein indicated.

Among suitable heterogeneous catalysts useful in the process are fuller's earth of the halloysite, montmorillonite, beidellite, nontronite, kaolinite, nacrite, dickite and metahalloysite types. Clays and the like having the several different hydrous aluminum silicate structures are effective catalysts though with different degrees of reactivity. The activity of each of these types of catalysts is improved by treatment of the clay with a dilute solution of a water-soluble mineral acid, preferably followed by washing with water to remove the free mineral acid and any water-soluble salts of such acid. Chemically pure hydrous aluminum silicate $Al_2O_3 \cdot 2SiO_2 \cdot 2H_2O$ also is an active catalyst. Thus the cations adsorbed on all natural clays are not necessary to impart to these clays chemical activity in this process.

All natural clays contain water, part of which is adsorbed and part of which is actually involved in the crystal lattice. It is preferred to remove substantially all of the adsorbed or physically bound water although, as previously stated, this is not necessary. This may be done by roasting the clay at approximately 200° C., or by azeotropic distillation with xylene or the like. The chemically bound water of the hydrous aluminum silicates must be retained to avoid rupture of the lattice structure and loss of catalytic activity.

The process of the invention can be conducted in various ways. The condensation preferably is effected under substantially anhydrous conditions. Generally, a mixture of the reactants, or the individual reactants, either as such or in solution in an inert solvent, can be added to the catalyst suspended in an inert liquid in which the reactants and reaction products are soluble. If desired, the catalyst can be suspended in the orthoformate with agitation and the alkenyl alkyl ether then added thereto slowly, with or without cooling. Here an inert solvent can be used if desired. Also, the reactants in admixture can be percolated through a bed of the catalyst. However, contact between the catalyst and the alkenyl alkyl ether should be avoided in the absence of the orthoformic ester since polymerization of the ether and loss thereof would occur.

The molar ratio of orthoformic ester to alkenyl alkyl ether can be varied considerably with corresponding variations in the proportions of the various condensation products made. At a 1:1 molar ratio of reactants excellent yields of the primary condensation products are obtained. At higher ratios of the ether to the orthoformic ester the higher molecular weight diacetals are produced in greater quantities with corresponding decrease in yield of the primary condensation product, as hereinafter exemplified.

The process can be conducted over a wide temperature range lying between about −50° C. and about 150° C., the upper limit being the temperature at which the reactants decompose appreciably in the presence of the catalyst. Practical temperature limits range between −10° C. and 100° C.

The amount of catalyst employed can be varied within wide limits. Excellent results are secured where the catalyst is used in amounts corresponding to 1% to 10%, based upon the weight of the total reactants, but greater or lesser amounts can be used, depending upon the reactivity of the reactants, the reaction rate desired, and the temperature employed. Where a fixed catalyst bed system is used the amount of catalyst may be very large with respect to the reactants contacted in unit time, 1,000% being possible. The particle size of the catalyst is a matter of choice. In a batch operation where a suspension of the catalyst in the reaction mixture is necessary, and in continuous processes using a catalyst slurry in an inert diluent, finely divided material is preferred. With a fixed catalyst bed, pellets of catalyst 0.25 inch or more in diameter may be used.

As already indicated, the reaction can be conducted in the presence of a solvent for the reactants which is inert thereto and to the products, but this is not necessary, and good results have been secured in the absence of such a solvent.

The diacetals made in the process can be isolated directly from the reaction mixture and catalyst in various ways, either with or without the prior removal of the catalyst by filtration or the like. This isolation generally is achieved by fractional distillation, preferably under subatmospheric pressure in the case of products boiling at around 150° C. or higher. Other means for recovery of the products, such as crystallization, sublimation or extraction with solvents can be used under suitable conditions. Preferably the catalyst is removed from the reaction mixture by filtration and the filtrate therefrom is fractionally distilled for recovery of the diacetals.

Typical orthoformic esters useful in the process are the methyl, ethyl, propyl, butyl, hexyl, octyl, decyl, tetradecyl, isopropyl, isobutyl, 2-ethylbutyl, 2-ethylhexyl, cyclohexyl, phenyl, benzyl, 2-chloroethyl, 2-bromoethyl, 2-methoxyethyl, 2-ethoxyethyl, 2-phenoxyethyl and allyl esters of orthoformic acid.

Typical alkenyl aliphatic ethers useful in the process are such 1-alkenyl, aliphatic ethers as vinyl methyl ether, vinyl ethyl ether, vinyl n-butyl ether, vinyl hexyl ether, vinyl 2-ethylhexyl ether and other vinyl alkyl ethers; halogen-substituted and alkoxy-substituted alkyl vinyl ethers such as vinyl 2-chloroethyl ether, vinyl 2- bromoethyl ether, vinyl 2-methoxyethyl ether and vinyl 2-ethoxyethyl ether; other alkenyl alkyl ethers such as propenyl ethyl ether, propenyl methyl ether, n-buten-1-yl-1 ethyl ether and 2-ethylhexen-1-yl-1 ethyl ether; and singly unsaturated heterocyclic ethers having an olefinic double bond in the 2-position such as 2-dihydrofuran and 2-dihydropyran, corresponding to the formula $CR^2R^3=CHOR^4$ wherein $R^2$ and $R^4$ together are $—(CH_2)_y—$, $R^3$ is hydrogen, and $y$ is 2 or 3.

The following examples will serve to illustrate the invention. In the examples all parts are given by weight unless otherwise specified.

The following illustrates how the substitution of the heterogeneous catalysts in the process for the homogeneous Friedel-Crafts catalysts increases the production of the initial condensation products and retards correspondingly the production of the higher moleclular weight products. For comparison, the yields and efficiencies of two experimental runs are given. In the runs, ethyl orthoformate and vinyl ethyl ether were reacted in the molar ratio of 1 to 1 at average temperatures of 30° C. in the presence of ethyl ether as solvent and 1% of the catalyst, based upon the total weight of the reactance. One run was made using boron trifluoride (catalyst A) as the catalyst. In the other run catalyst B was used—a dried clay of the montmorillonite type which had been activated by treatment with a water-soluble mineral acid, followed by removal of excess activating acid and water-soluble products of the activation. After removal of the catalyst by filtration the products of the condensation were isolated by fractional distillation under vacuum. The results are given in the following table:

Table

| Product | Yield, Per Cent,[1] Catalyst | | Efficiency, Per Cent,[1] Catalyst | |
|---|---|---|---|---|
| | A | B | A | B |
| 1,1,3,3-tetraethoxypropane | 62 | 79.6 | 80 | 88.5 |
| 1,1,3,5,5-pentaethoxypentane | 8.5 | 2.1 | 11 | 3.3 |
| 1,1,3,5,7,7-hexaethoxyheptane | 2.5 | 0.4 | 3.3 | 0.7 |

[1] The yields and efficiencies were based upon the ethyl orthoformate.

*Example 1*

Into a stirred suspension of 22 parts of a dried, acid-activated clay catalyst of the montmorillonite type being marketed under the trade name "Filtrol X-202" in 1,480 parts of ethyl orthoformate, 720 parts of vinyl ethyl ether were introduced over a period of one hour while allowing the temperature to rise from 23° C. initially to 49° C. The catalyst then was filtered off, and the filtrate was fractionally distilled under subatmospheric pressure. In addition to 148 parts of unreacted ethyl orthoformate there were recovered:

| Product | Parts | Yields, Per Cent[1] | Efficiencies, Per Cent[1] |
|---|---|---|---|
| (A) 1,1,3,3-tetraethoxypropane | 1,752 | 79.6 | 88.5 |
| (B) 1,1,3,5,5-pentaethoxypentane | 86.3 | 2.1 | 3.3 |
| (C) 1,1,3,5,7,7-hexaethoxyheptane | 23.5 | 0.4 | 0.7 |

[1] Based upon the Orthoformate.

These products have the following physical properties:

| Product | Boiling Point | | Specific Gravity | $n_D^{30°C.}$ |
|---|---|---|---|---|
| | Temperature at °C. | Pressure, mm. Hg | | |
| (A) | 105 | 15 | 0.912 at 30°/15.6° C. | 1.4080 |
| (B) | 90 | 1 | 0.9233 at 28.2°/20° C. | 1.4180 |
| (C) | 118–123 | 0.2 | 0.933 at 30°/15.6° C. | 1.4258 |

The clay catalyst had been activated by treatment with a dilute aqueous solution of a water-soluble mineral acid, following which substantially all of the mineral acid was removed by washing with water.

*Example 2*

Into a stirred suspension of 2.2 parts of the catalyst described in Example 1 in 150 parts of dry isopropyl ether maintained at 30° C., was introduced a mixture of 148 parts of ethyl orthoformate and 72 parts of vinyl ethyl ether during one hour. The reaction mixture then was filtered immediately, and the filtrate was fractionally distilled under subatmospheric pressure, yielding 136 parts of 1,1,3,3-tetraethoxypropane, corresponding to a yield of 61.7% and an efficiency of 86.9%, both based upon the ethyl orthoformate.

*Example 3*

In a similar run under conditions identical with those used in Example 2, excepting that a reaction temperature of 50° C. was employed, a yield of 71.2% of 1,1,3,3-tetraethoxypropane was secured at an efficiency of 91.9%, both based upon the ethyl orthoformate.

*Example 4*

Under conditions identical with those of Example 2 excepting that 11 parts of the catalyst were employed, a yield of 1,1,3,3-tetraethoxypropane of 72.2% was secured at an efficiency of 86%, both based upon the ethyl orthoformate.

*Example 5*

Under conditions identical with those of Example 2 excepting that 11 parts of the said catalyst were employed and the reaction mixture was maintained at 0° C.–10° C. during the reaction, a yield of 71.8% of 1,1,3,3-tetraethoxypropane was secured at an efficiency of 85.4%, both based upon the ethyl orthoformate.

*Example 6*

Into a stirred suspension of 11 parts of a natural fuller's earth being marketed as "Attapulgus 'A' grade fuller's earth" and 150 parts of isopropyl ether a solution of 148 parts of ethyl orthoformate and 72 parts of vinyl ethyl ether was added over a period of 2 hours while maintaining the reaction mixture at 23° C.–55° C. After stirring for 16 additional hours at about 25° C., the catalyst was filtered off, and the filtrate was fractionally distilled at subatmospheric pressure. There were recovered 1,1,3,3-tetraethoxypropane in a yield of 41.4% at an efficiency of 61.2%, both based upon the ethyl orthoformate. The catalyst contained 3% of water.

*Example 7*

Into a stirred suspension of 5 parts of the catalyst described in Example 1 in 146 parts of ethyl ether there was added during 1.5 hours a solution of 296 parts of ethyl orthoformate and 172 parts of dihydropyran

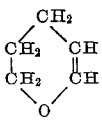

while maintaining the reaction mixture at 30° C. After an additional 16.5 hours at room temperature the catalyst was removed by filtration and the filtrate was fractionally distilled under subatmospheric pressure. There were recovered, in addition to unreacted dihydropyran and ethyl orthoformate, 120 parts of 2-ethoxy-3-diethoxymethyltetrahydropyran,

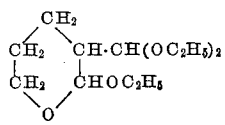

or

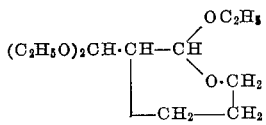

corresponding to a yield of 25.8% at an efficiency of 67.8%, both based upon the ethyl orthoformate. This compound boiled at 60° C.–61° C. under an absolute pressure of 0.5 mm. of mercury; had a specific gravity at 30° C. of 0.971, and a refractive index at 30° C. of 1.4302. Its elementary analysis was:

|  | Carbon | Hydrogen |
|---|---|---|
|  | Per cent | Per cent |
| Found | 62.1 | 10.2 |
| Calculated for $C_{12}H_{24}O_4$ | 61.9 | 10.4 |

Example 8

Into a suspension of 3 parts of the activated clay hereinafter described in 200 parts of ethyl ether a solution of 201 parts of tri-n-butyl orthoformate and 87 parts of n-butyl vinyl ether was added over a period of 1.08 hours while maintaining the reaction mixture at 0° C.–10° C. by cooling. After 2 additional hours the catalyst was removed by filtration and the filtrate was fractionally distilled under subatmospheric pressure. There were separately recovered, in addition to unreacted orthoformate, 89 parts of 1,1,-3,3-tetra-n-butoxypropane, boiling at 128° C. under an absolute pressure of 0.5 mm. of mercury, and having a specific gravity at 30°/15.6° C. of 0.883, and a refractive index at 30° C. of 1.4263; and 58.5 parts of 1,1,3,5,5-penta-n-butoxypentane and higher condensation products. The yield of tetrabutoxypropane was 31%, at an efficiency of 65%, both based upon the orthoformate. The yield and efficiency of the higher condensation products were 16% and 33%, respectively.

The catalyst was made by stirring 500 parts of a montmorillonite clay being marketed under the trade name "Filtrol X–415," with about 535 parts of a 10% aqueous solution of sulfuric acid, for 0.5 hour at 25° C. The mixture then was filtered and the treated clay was washed repeatedly with distilled water until free from water-soluble sulfate ions. The filter cake then was dried for 16 hours at 200° C., pulverized to pass a 100-mesh screen, dried at 195° C. for 8 hours, and used as catalyst.

Example 9

To a suspension of 3 parts of the activated clay described in Example 8 in 200 parts of ethyl ether a solution of 203 parts of 2-ethylhexyl orthoformate and 78 parts of 2-ethylhexyl vinyl ether was added over a period of 1.08 hours while maintaining the reaction mixture at 0° C.–10° C. by cooling. After 2 additional hours the catalyst was removed by filtration, and the filtrate was fractionally distilled under vacuum. There were separately recovered, in addition to unreacted 2-ethylhexyl vinyl ether, boiling at 64° C.–67° C. under a pressure of 10 mm. of mercury, and unreacted 2-ethylhexyl orthoformate, boiling at 164° C. under a pressure of 2 mm. of mercury, 148 parts of 1,1,3,3-tetra-2-ethylhexoxypropane, having a specific gravity at 30°/15.6° C. of 0.870, and a refractive index at 30° C of 1.4458. The yield of the product was 53%, at an efficiency of 82%, both based upon the orthoformic ester.

Example 10

To a stirred suspension of 12 parts of the clay described in Example 8 in 85 parts of toluene there was added over a period of one hour at 30° C. a mixture of 155 parts of ethyl orthoformate, 76 parts of vinyl ethyl ether, and 81 parts of toluene. After an additional hour stirring the catalyst was filtered off and the filtrate was fractionally distilled under vacuum. There were separately recovered, in addition to unreacted ethyl orthoformate, 134 parts of 1,1,3,3-tetraethoxypropane and 24 parts of 1,1,3,5,5-pentaethoxypentane. The yield of the tetraethoxypropane was 58%, at an efficiency of 79%, both based upon the ethyl orthoformate.

By the practice of the present invention good yields of diacetals of malondialdehyde and substituted malondialdehydes useful as pharmaceutical intermediates can be produced with good efficiencies by the use of heterogeneous catalysts which are not destroyed either in the condensation process or during the recovery of the diacetals and which may be used repeatedly in the process.

I claim:

1. Process for preparing a diacetal of a saturated dialdehyde having an odd number of at least three carbon atoms in the dialdehyde carbon chain, each of the terminal carbon atoms of such chain having directly attached thereto two oxy atoms of a corresponding acetal group and each odd-numbered carbon atom of the dialdehyde carbon chain, excepting said terminal carbon atoms, having directly attached thereto one oxy atom, which comprises reacting an ester of orthoformic acid with an unsaturated ether selected from the class consisting of the open chain 1-alkenyl alkyl ethers, the 1-alkenyl cycloalkyl ethers, the 1-alkenyl halogenated alkyl ethers, the 1-alkenyl alkoxyalkyl ethers, and the singly unsaturated heterocyclic ethers having oxygen as the only hetero atom and having an olefinic double bond in the 2-position, in the presence of a hydrous aluminum silicate.

2. Process as defined in claim 4 wherein said hydrous aluminum silicate is a dry hydrous natural clay.

3. Process for preparing a diacetal of a saturated dialdehyde having an odd number of at least three carbon atoms in the dialdehyde carbon chain, each of the terminal carbon atoms of such chain having directly attached thereto two oxy atoms of a corresponding acetal group and each odd-numbered carbon atom of the dialdehyde carbon chain, excepting said terminal carbon atoms, having directly attached thereto one oxy atom, which comprises reacting an ester of orthoformic acid with an unsaturated ether selected from the class consisting of the open chain 1-alkenyl alkyl ethers, the 1-alkenyl cycloalkyl ethers, the 1-alkenyl halogenated alkyl ethers, the 1-alkenyl alkoxyalkyl ethers, and the singly unsaturated heterocyclic ethers having oxygen as the only hetero atom and having an olefinic double bond in the 2-position, in the presence of a clay possessing a hydrous aluminum silicate structure in which a portion of the aluminum and silicon atoms have been replaced by corresponding atoms of at least one member of the class consisting of sodium, potassium, calcium, magnesium and iron.

4. Process for preparing a diacetal of a saturated dialdehyde having an odd number of at least three carbon atoms in the dialdehyde carbon chain, each of the terminal carbon atoms of such chain having directly attached thereto two oxy atoms of a corresponding acetal group and each odd-numbered carbon atom of the dialdehyde carbon chain, excepting said terminal carbon atoms, having directly attached thereto one oxy atom, which comprises reacting an ester of orthoformic acid with an unsaturated ether selected from the class consisting of the open chain 1-alkenyl alkyl ethers, the 1-alkenyl cycloalkyl ethers, the 1-alkenyl halogenated alkyl ethers, the 1-alkenyl alkoxyalkyl ethers, and the singly unsaturated heterocyclic ethers having oxygen as the only hetero atom and having an olefinic double bond in the 2-position, in the presence of an acid-activated hydrous aluminum silicate.

5. Process for preparing a diacetal of a saturated dialdehyde having an odd number of at least three carbon atoms in the dialdehyde carbon chain, each of the terminal carbon atoms of such chain having directly attached thereto two oxy atoms of a corresponding acetal group and each odd-numbered carbon atom of the dialdehyde carbon chain, excepting said terminal carbon atoms, having directly attached thereto one oxy atom, which comprises reacting an ester of orthoformic acid with an unsaturated ether selected from the class consisting of the open chain 1-alkenyl alkyl ethers, the 1-alkenyl cycloalkyl ethers, the 1-alkenyl halogenated alkyl ethers, the 1-alkenyl alkoxyalkyl ethers, and the singly unsaturated heterocyclic ethers having oxygen as the only hetero atom and having an olefinic double bond in the 2-position, in the presence of an inert diluent for the reactants and of a substantially dry hydrous natural clay.

6. Process for preparing a diacetal of a saturated dialdehyde having an odd number of at least three carbon atoms in the dialdehyde carbon chain, each of the terminal carbon atoms of such chain having directly attached thereto two oxy atoms of a corresponding acetal group and each odd-numbered carbon atom of the dialdehyde carbon chain, excepting said terminal carbon atoms, having directly attached thereto one oxy atom, which comprises reacting an ester of orthoformic acid with an unsaturated ether selected from the class consisting of the open chain 1-alkenyl alkyl ethers, the 1-alkenyl cycloalkyl ethers, the 1-alkenyl halogenated alkyl ethers, the 1-alkenyl alkoxyalkyl ethers, and the singly unsaturated heterocyclic ethers having oxygen as the only hetero atom and having an olefinic double bond in the 2-position, in the presence of an inert diluent for the reactants and of a substantially dry acid-activated hydrous natural clay.

7. Process for preparing a diacetal of a saturated dialdehyde having an odd number of at least three carbon atoms in the dialdehyde carbon chain, each of the terminal carbon atoms of such chain having directly attached thereto two oxy atoms of a corresponding acetal group and each odd-numbered carbon atom of the dialdehyde carbon chain, excepting said terminal carbon atoms, having directly attached thereto one oxy atom, which comprises reacting an ester of orthoformic acid with an unsaturated ether selected from the class consisting of the open chain 1-alkenyl alkyl ethers, the 1-alkenyl cycloalkyl ethers, the 1-alkenyl halogenated alkyl ethers, the 1-alkenyl alkoxyalkyl ethers, and the singly unsaturated heterocyclic ethers having oxygen as the only hetero atom and having an olefinic double bond in the 2-position, in the presence of an inert diluent for the reactants and of an acid-activated hydrous aluminum silicate.

FRANK G. YOUNG.

No references cited.